March 5, 1935.   C. E. KENNEDY   1,993,609
COOKING, FRYING, DOUGHNUT MAKING, AND DIPPING MACHINE
Filed April 24, 1933   4 Sheets-Sheet 1
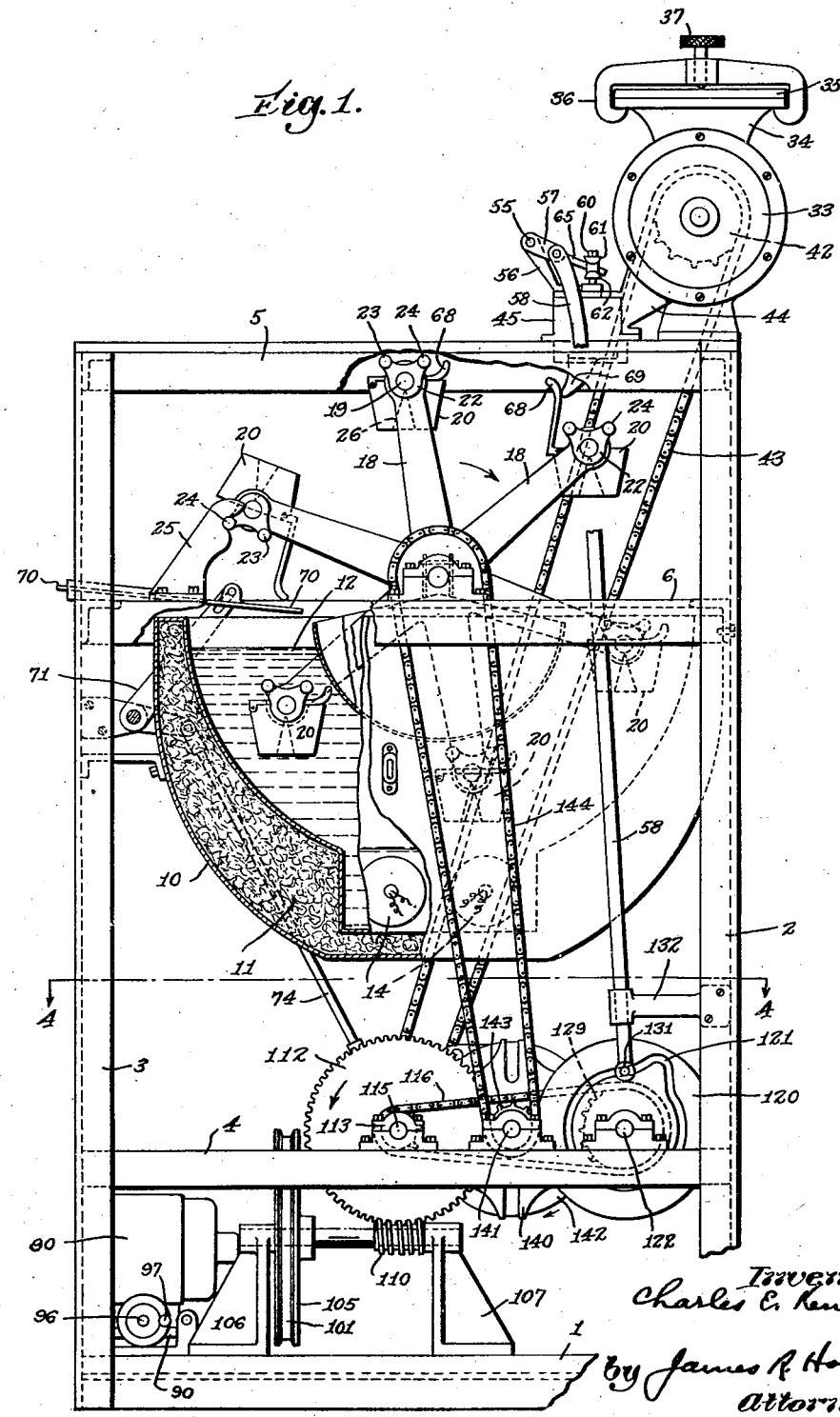

March 5, 1935.  C. E. KENNEDY  1,993,609
COOKING, FRYING, DOUGHNUT MAKING, AND DIPPING MACHINE
Filed April 24, 1933  4 Sheets-Sheet 2
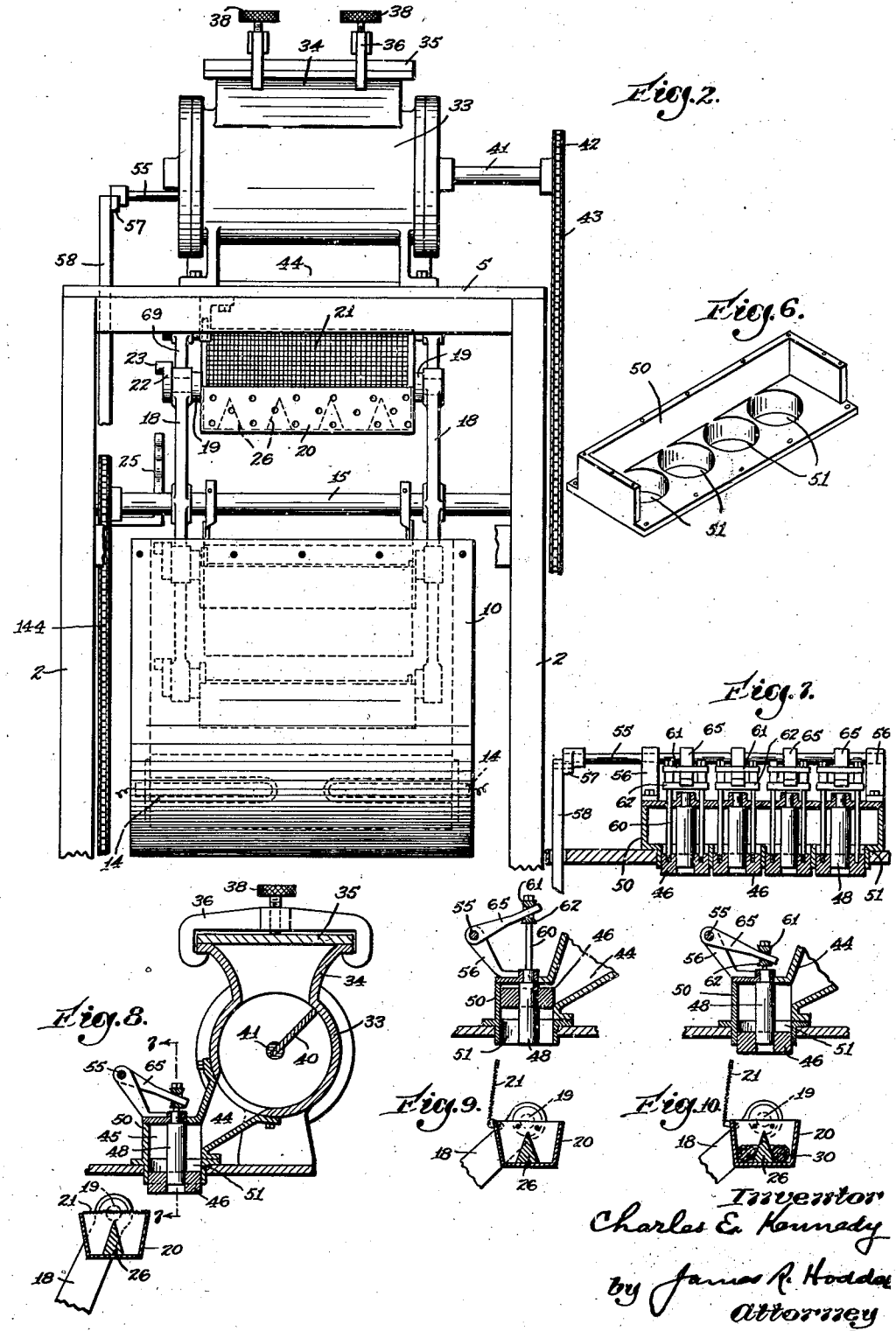
Inventor
Charles E. Kennedy
by James R. Hodda
Attorney March 5, 1935.  C. E. KENNEDY  1,993,609
COOKING, FRYING, DOUGHNUT MAKING, AND DIPPING MACHINE
Filed April 24, 1933  4 Sheets-Sheet 3
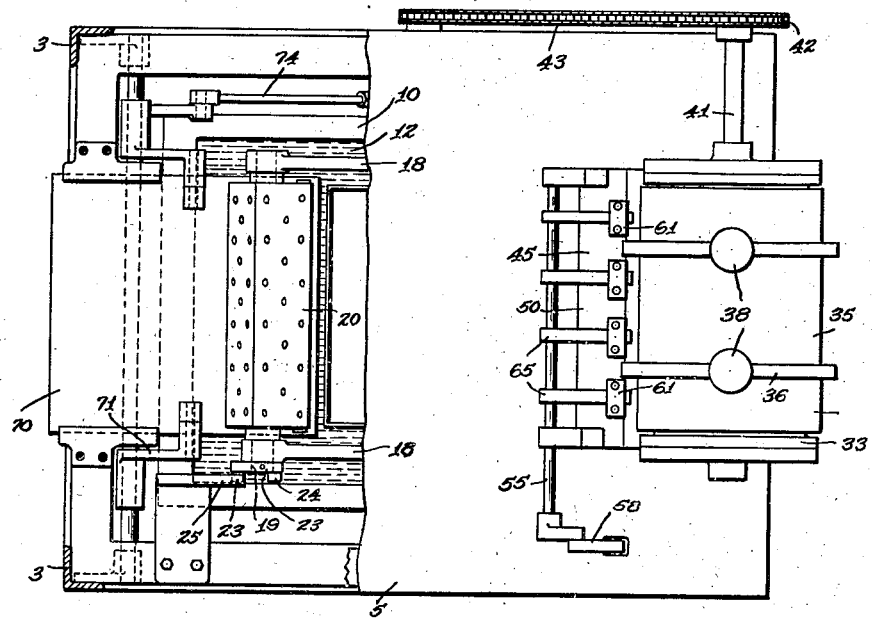
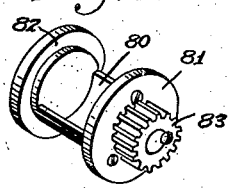
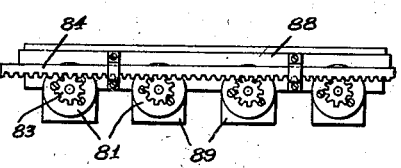
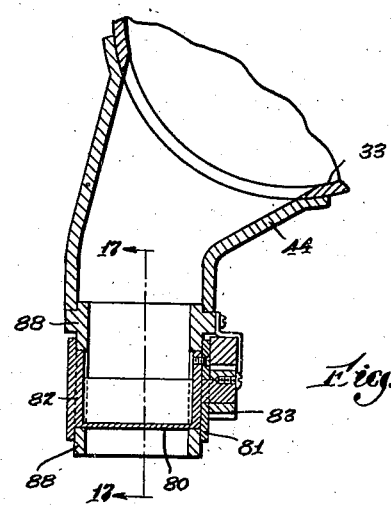
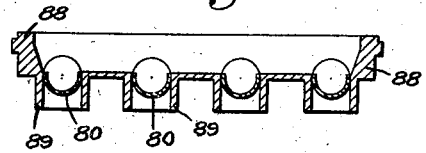
Inventor
Charles E. Kennedy
by James R. Hodder
Attorney March 5, 1935.　　C. E. KENNEDY　　1,993,609
COOKING, FRYING, DOUGHNUT MAKING, AND DIPPING MACHINE
Filed April 24, 1933　　4 Sheets-Sheet 4

Inventor
Charles E. Kennedy
by James R. Hodder
Attorney

Patented Mar. 5, 1935

1,993,609

UNITED STATES PATENT OFFICE

1,993,609

COOKING, FRYING, DOUGHNUT-MAKING, AND DIPPING MACHINE

Charles E. Kennedy, West Bridgewater, Mass., assignor to Jones & Vining, Inc., Brockton, Mass., a corporation of Massachusetts Application April 24, 1933, Serial No. 667,749

1 Claim. (Cl. 53—7)

My present invention is a novel and improved automatic machine for cooking articles by a deep fat frying process and, preferably, also to form such articles, such as doughnuts, fritters, croquettes, or the like automatically and to effect the frying action automatically.

In prior machines of similar types, various efforts have been made to form and fry doughnuts, and conduct the same by conveyors or the like through the hot fat or liquid, but such prior machines have been extremely cumbersome, large, and expensive and have failed to be satisfactory in operation.

An important object of my invention is to simplify the deep fat frying process, to provide a machine extremely light, inexpensive, readily operable and easily constructed and operated, and capable of use in small units such as lunch counters, households, or the like, and where an expensive machine would be impracticable and, hence, my machine has a wide field of usefulness.

A further object of my present invention is to provide a machine which will simulate the hand-dipping action in deep fat frying or cooking. This is an important feature since the dipping action permitting the article being fried, to have the benefit of passing substantially through the bottom of the receptacle, produces much better results than the former method of conveying such articles along the top only of the hot liquid in the receptacle.

Simple and efficient means are provided for forming doughnuts, fritters, croquettes, fish balls, or the like, transferring the same to open-work baskets arranged on rotatable arms to effect the dipping action and, thereafter, to be automatically inverted on a movable plate or carrier and the baskets re-righted for a succeeding loading and dipping action.

Referring to the drawings illustrating further novel combinations, features, and advantages which will be hereinafter more fully pointed out and claimed, Fig. 1 is a side view partly in cross-section illustrating a preferred embodiment of the invention;

Fig. 2 is a front view;

Fig. 3 is a plan view;

Fig. 6 is a fragmentary perspective view of the plate through which the material is forced when formed;

Figure 13:
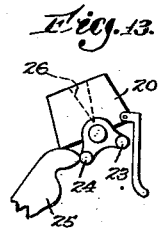
Figures 11, 12:
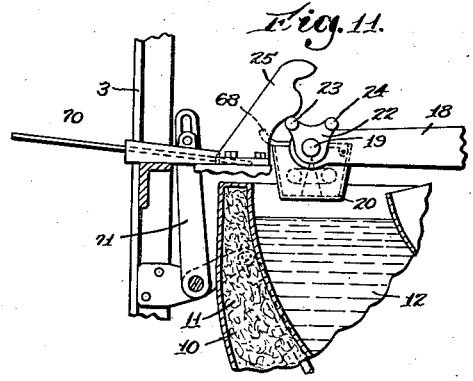

Fig. 7 being a cross-sectional view illustrating a set of doughnut-forming and delivering devices;

Fig. 8 is a cross-sectional view of a portion of Fig. 2;

Figs. 9 and 10 are fragmentary progressive views of the doughnut-forming and delivering devices;

Figs. 11, 12, and 13 being fragmentary views of the basket inverting, delivering, and repositioning actions;

Fig. 14 is an enlarged fragmentary view of the attachment for forming fritters, croquettes, crullers, fish cakes, or the like;

Fig. 15 is a perspective of the scoop for use in forming and delivering,

Figs. 16 and 17 are side and cross-sectional views respectively of the scoop actuating means when operated by hand.

In the cycle of operations of my present machine, when for example the doughnut-forming devices are in use, as will be first described, a suitable supply of material, such as doughnut batter, is mixed and applied to the tank at the top of the machine. The machine being in operation, a quantity is fed by gravity and suction through a delivery opening into the doughnut-forming and delivering devices, punching out a usual doughnut-shaped article, and operating to deliver the same into a basket on the end of a rotating arm, which moves with a series of other arms and baskets in a step-by-step action in timed relation with the basket delivery mechanism.

These open baskets are then closed with a screen, and the continued rotation of the same effects a progressive movement in the dipping action through the deep hot fat, the entire mechanism being timed so that the movement of the baskets will be completed through and out of the hot fat in proper time to complete the cooking of the articles so treated. Thereupon, each basket is inverted and, meanwhile, a reciprocating carrier slides underneath the basket as it is inverted, receives the article or a plurality of articles, the machine herein shown being fitted to make four simultaneously. Thereupon the basket is swung right side up; the carrier with its load of baskets is moved out of the way of the succeeding basket, and the empty basket moved into position to receive the next charge. Preferably also, I utilize electrical heating units to bring the deep fat to the proper temperature, although gas, steam, or any suitable heat-applying element may be employed.

As shown in the drawings, a suitable framework comprising a base 1, four upstanding posts 2—2 and 3—3, preferably of angle iron or the like, with a suitable cross-piece or platform 4, which, together with the base 1 carries the motor and mechanism, and an upper or top platform 5 constitute an open supporting framework for the apparatus. An intermediate pair of cross braces 6—6 support suitable bearings and the receptacle to contain the deep fat.

The receptacle is designated generally at 10, and preferably comprises inner and outer walls containing insulating material 11 to conserve the heat of the hot fat or liquid 12, which may be heated by a pair of electrical heating units 14—14. Mounted over the receptacle 10 in a set of bearings 16, mounted on the cross-frames 6, is an axle 15, to which are secured a set of rotatable spokes or arms 18, 18. At the end of each of these arms is a bearing for a stud 19, carrying baskets 20, each being adapted to receive a plurality of articles to be formed by the machine, four being shown herein. Preferably also a screen cover 21 is fitted to cover the baskets 20. On an end of the basket 20, to the left viewed in Fig. 2, is a plate 22 extending outside the adjacent spoke 19 and said plate being fitted with a pair of projecting studs 23 and 24 in position to strike against the cam face of the bracket 25 to effect the upsetting of the basket 20 at the completion of the cooking action, as will be explained.

The baskets 20 may have a plurality of cones 26 formed therein to center, separate, and hold the doughnuts 30 as the latter are dropped into the basket from the forming and feeding mechanism. Situated at the top of the machine is a mixing chamber 33, to which a hopper or opening 34 permits the batter or dough to be applied, a cover 35 being affixed, and one or more clamps 36 holding the same firmly in position by a plurality of thrusting thumb screws 38.

Within the mixing chamber 33 I prefer to arrange an agitator 40 mounted on a shaft 41, which extends outside the mixing chamber to a sprocket wheel 42, and which is rotated by a chain 43 extending to a corresponding sprocket at the base of the machine. From the mixing chamber 33 a filling trough 44 extends into the forming and feeding portion of the receptacle 45. This extends cross-wise of the mixing chamber 33 and contains a series or plurality of pistons 46 and cores 48. This forming chamber 45 opens directly into the path of movement of the baskets 20 when in rotating or filling position in the cycle of operations. Each piston 46 has a central recess adapted to fit over the core 48, the latter being to form the hole in the doughnut, and each core being held in the upper part of the forming chamber, as clearly shown in Fig. 7, by a short trunnion or the like. As the top is removable with the cores, this enables the entire forming chamber to be readily cleaned, if desired, or removed and replaced for another forming chamber and instrumentalities, as will be explained. The forming chamber comprises a box-like portion, as shown at 50, Fig. 6, having a plurality of openings therethrough 51—51, of appropriate diameter to receive the pistons 46.

To raise and lower the series of pistons 46 around the cores 48, I provide an oscillating bar 55 extending through bearings formed on brackets 56—56, attached to the top of the forming chamber, and to which a crank 57 and operating rod 58 are pivotally connected to effect the reciprocation. In alignment with each piston 46 is a pair of rods 60—60, threaded into the base of the piston 46 and extending through recesses in the top or cover of the forming chamber, with upper and lower cross members 61, 62 which are engaged loosely by a rocker arm 65, keyed to the shaft 55, and therefore adapted to raise and lower the pistons with the rocking of the shaft 55.

Preferably these cross bars 61 and 62 are rounded off, as shown in Figs. 9 and 10, to facilitate the raising and lowering by the rocking arms 65, as will be readily appreciated.

To effect the raising of the screen cover 21, I secure on the edge of each screen cover a curved lifting finger 68 adapted to contact with the fixed member 69 (see Fig. 1) so that the cover is raised as the basket 20 is being positioned in alignment with the forming chamber 45.

In order to effect a dumping and delivery of the cooked articles after they have been through their cycle in the hot fat, I arrange a reciprocating carrier or plate 70 adapted to be movable underneath the basket 20 about to be inverted and to be in position when it is inverted and then to be retracted out of the way of the path of movement of the succeeding basket 20, thus receiving and moving the charge of doughnuts or articles outside the line of travel of the machine. This plate 70 is carried in and out of such position by attachment of a rocker arm 71, being one arm of a bell crank lever 72, with the other arm 73 attached to an operating lever 74. These are fitted to appropriate bearings in the side of the machine at the delivery end, viz. the left, viewed in Fig. 1.

The cycle of operations of the apparatus as thus far described will now be explained. The machine being in operation, the motor and connecting mechanism will be described in detail later. With the machine in operation, a mass, quantity, mixture, or batch of batter is applied in the chamber 33, the cover 36 applied, and the fastening clamps fitted and thumb screws manipulated to clamp the cover firmly in position.

The agitator 40 in its rotative movement within the chamber 33 forces the mixture through the passage 44 into the forming chamber 45 formed by the box 50. Then the pistons 46, which are raised and lowered by the oscillation of the rocking shaft 55, force and squeeze the material therearound and about the core 48, the pistons being relatively loose for this purpose, these also acting as kneading or working members. Thereupon, as the pistons 48 descend, they will force the material, which has been squeezed around them and the core 48 downwardly out and clear of the machine and into the basket 20, which at this time in the cycle will be in position underneath the same, with the cover 21 open as shown in Figs. 9 and 10, the formed doughnuts being dropped into the basket and centered around the cones 26. As the spokes 18 are moved in the step-by-step action in timed intervals, the now filled box 20 is lowered, the cover 21 will drop of its own weight, and the basket dipped into the hot liquid 12 until reaching and emerging at the outer end. Thereupon the continued rotating action of the spokes 18 will cause the first studs 23 to engage the cam face of the bracket 25, and the continued action will effect the inverting and righting of the baskets, as shown progressively in Figs. 11, 12, and 13. Meanwhile, the delivery plate 70 has been moved under the basket 20 about to be inverted, held in position to receive the set of four doughnuts dropped therefrom, and then the plate 70 is retracted out of the way of the next oncoming basket 20.

While I have described the machine as thus far explained as and for the purpose of forming, cooking, and delivering doughnuts, I contemplate the substitution of different forming chambers 45 for the making of different articles, all of which will be cooked by the dipping action in the deep fat and with the cycle of the machine substantially in the same time relation. Thus, I have illustrated in Figs. 14, 15, 16, and 17 a different forming and delivering member, which can be slid into position in place of the doughnut forming devices. This interchangeability is of great importance as I can adapt my machine for many different kinds of forming and cooking articles.

Thus, referring to Figs. 14, 15, 16, and 17, I have illustrated a forming mechanism which is capable of segregating from the mass of material in the mixing chamber 33 round articles, such as croquettes, fritters, or the like, this action being effected by the rotation of a series of half-circle cutting members 80, see Fig. 15, having flanges 81 and 82, a gear wheel 83 on the outside of each being thus rotated by a rocking bar 84 actuated by a handle 85, through a link 86, and automatically moved, if desired, by a rod 87 to a suitable source of power to oscillate the same. This series of cutters 80 will be mounted in a separate forming box 88, each preferably formed with a chute 89 to guide and conduct the material cut from the batch delivered into the forming box 80 and to be positioned in alignment over the basket 20 when the same is in position to receive it.

The operating mechanism will now be described.

Mounted in the lower portion of the machine is a motor 90 preferably held in the framework 91, arranged to slide on a pair of guide rods 92, 92. A means to adjust and hold the motor frame on its rods is provided by a threaded screw 93 fitting into a bearing at 94 on the motor frame and in a threaded bearing 95 on the frame carrying the rods 92. A wheel 96 and handle 97 enables the operator to manipulate the same and to move the motor to and fro on its guides, and thus effect adjustment of the driving means.

Figure 5:
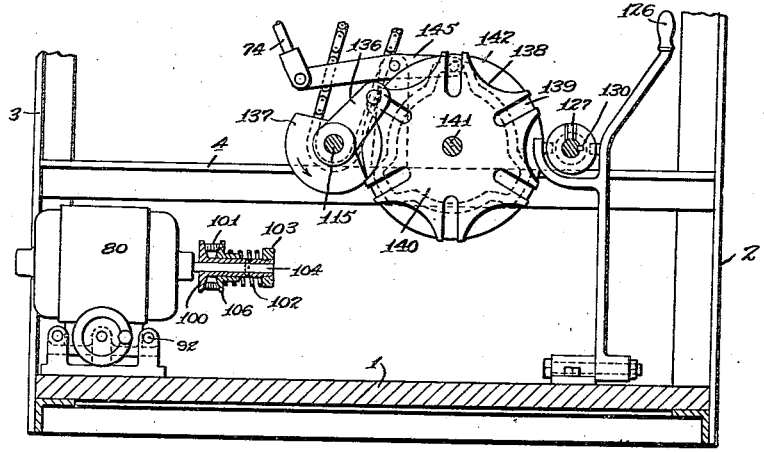
Fig. 5 is a cross-sectional view on the line 5—5 of Fig. 4.
Figure 4:
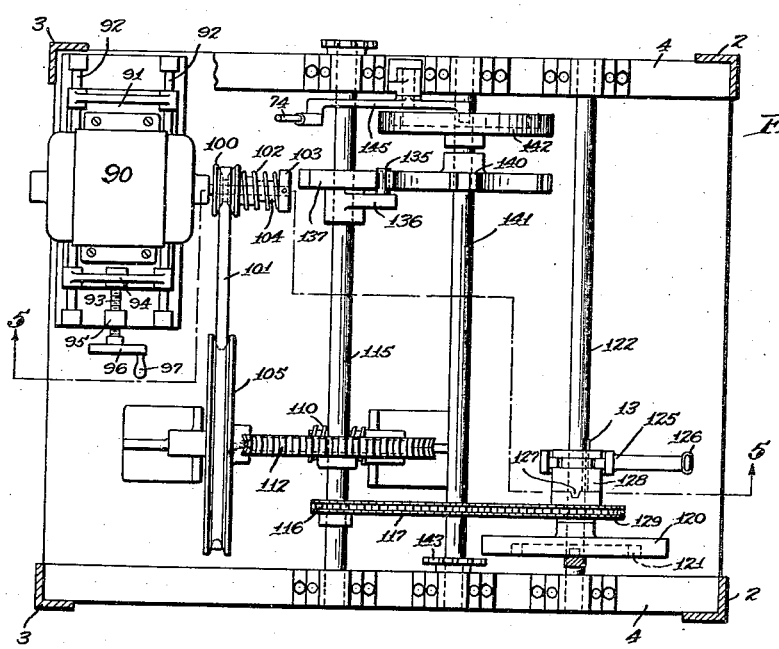
Fig. 4 is a plan view of a portion of operating mechanism underneath the cooking receptacle on the line 4—4 of Fig. 5.

For this purpose I secure to the armature 104 of the motor a split pulley, each half having bevelled faces as shown in Figs. 4 and 5 at 100 and 106, through which the V- or wedge belt 101 may be led, a spring 102 surrounding the sleeve carrying the portion 100 and bearing between the member 106 and a collar 103. The belt 101 transfers power to the main drive pulley 105 and the movement of the motor 80 to and fro on its guide rods 92 produces a variation in the driving speed and action, as will be appreciated. The pulley 105 is mounted in suitable brackets 106 and 107 secured to the base 1 and carries a shaft having a worm 110 adapted to mesh with the teeth of a pulley 112 mounted in bearings 113 on the cross bars 40, and having on its shaft 115 a pinion 116 to drive a sprocket 117 which, in turn, drives a cam wheel 120 having a face cam 121 cut therein. Mounted on an axle 122, also in suitable bearings on the cross bars 4. A hand clutch 125 having a handle 12, a single tooth 127 on a hub 128, adapted to mesh with a correspondingly single recess throughout its circumference in the hub of the sprocket 129 around which the chain 116 engages, is provided.

A clutch 125 is secured to the shaft 122 by the key 130, while the sprocket wheel 129 rotates freely on the shaft 122 until engaged by the tooth 127 on the clutch. By this arrangement, when the clutch engages the sprocket, the cam wheel 121 will necessarily and accurately be rotated in timed relation with the cycle of the machine. The cam slot 121 is engaged by a roll 131 on the rod 58 which operates the pistons in the doughnut forming machine, see Fig. 1. Preferably a guide bracket 132 is fitted to hold the rod 58 and through which it reciprocates during the cam action.

On the opposite end of the shaft 115 is a step-by-step driving and locking and holding mechanism after the manner of the well known Geneva stop. This comprises a driving tooth 135 mounted on an arm 136 secured to the shaft 115 and a disc 137 adjacent said toothed arm, the disc being arranged to engage the recesses 138 between slots 139 in the disc wheel 140 mounted adjacent thereto and in position to be rotated by the tooth 135, the disc 137 holding and locking the toothed wheel during successive one-step movement, as will be readily appreciated. The wheel 140 is mounted on the axle 141 arranged in suitable bearings on the framework 4 and carries at one end a cam wheel 142, and at its other end a sprocket 143, which sprocket drives a chain 144 to turn the spokes 18 carrying the baskets in their step-by-step movement.

The cam wheel 142 has a face cam, shown in dotted lines, to oscillate the lever 145 which rocks the rod 74, reciprocating the plate 72 to and from in timed relation with the other operations of the machine.

The entire operating mechanism is compact, and rigidly positioned at the base of the machine, with the shafts, moving parts, and sprockets at either side, and the step-by-step movement of the mechanism is accurately controlled by a single toothed clutch 127, the Geneva drive, and stop. Thus, the timed-movement of the plungers or cutters forming the article, the positioning and opening of the baskets to receive the same, the dipping of the baskets through the hot fat in the proper time to effect the cooking desired, and the inverting and removal of the cooked articles from the baskets onto the plate 70 are gradually timed in proper sequence. The substitution of one forming operation, such as 88, for the doughnut forming mechanism at 45 is also readily effected, and the substitution of other devices can be as easily arranged, as will be readily appreciated.

I claim:

Cooking apparatus of the kind described, comprising material holding, mixing, and forming means, mechanism to actuate said forming devices in cooperation with the mixing means, a carrier, a heated receptacle adapted to hold and heat cooking liquid arranged adjacent said mixing and forming mechanism, a rotatable series of spokes carrying open material-holding baskets adapted to receive a plurality of articles from said forming mechanism and to dip the same through the cooking liquid, means to invert said baskets and deliver the cooked contents onto a carrier, said carrier being reciprocated into the path of movement of the basket being inverted, and thereupon removed from the path of movement of the succeeding basket, said carrier and said inverting operation cooperating in timed relation.

CHARLES E. KENNEDY.